June 24, 1941.  F. G. CORNELL, JR  2,247,152
HEAT EXCHANGE DEVICE
Filed Aug. 31, 1938  2 Sheets-Sheet 1
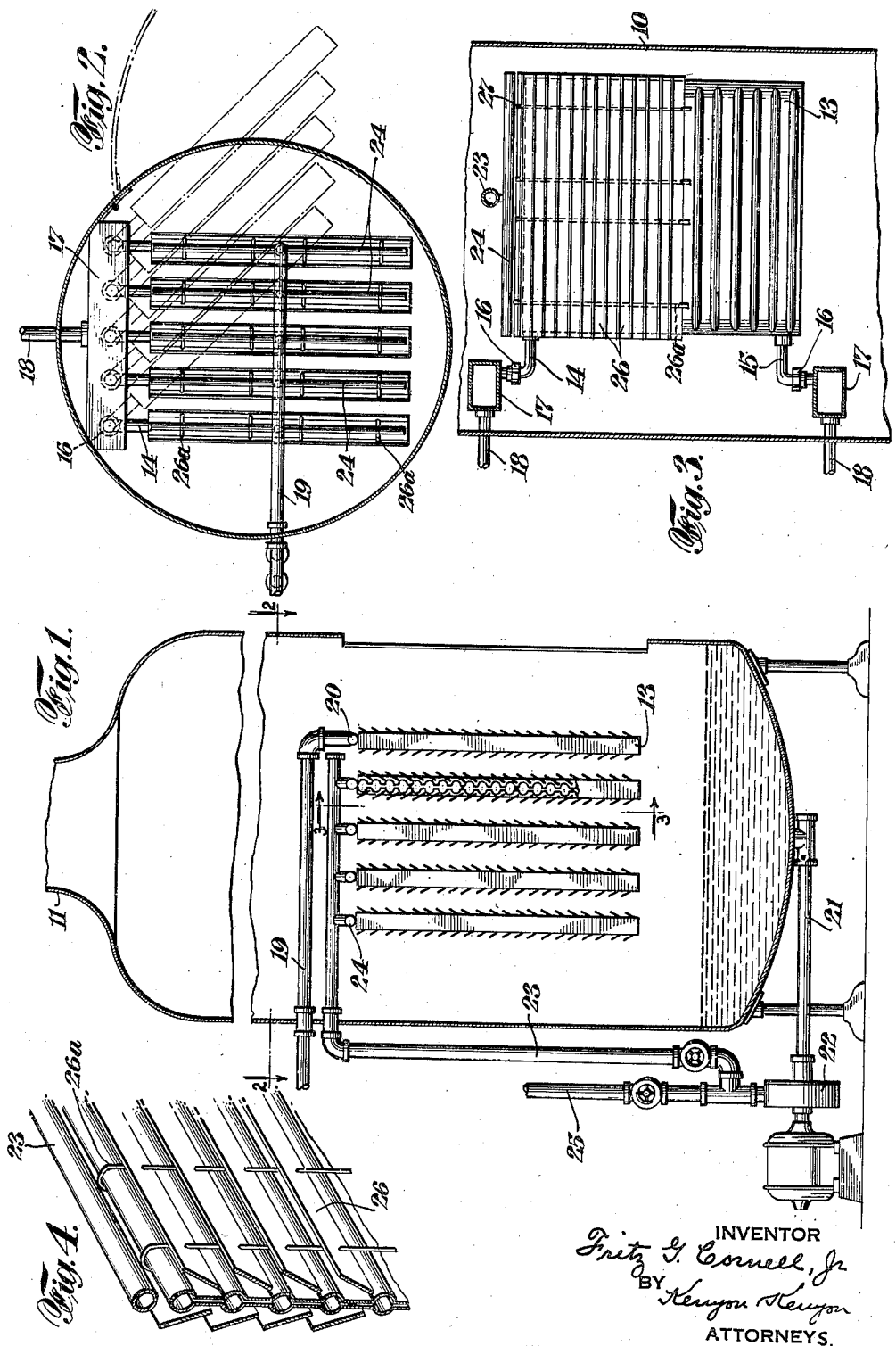

June 24, 1941.  F. G. CORNELL, JR  2,247,152
HEAT EXCHANGE DEVICE
Filed Aug. 31, 1938   2 Sheets-Sheet 2

INVENTOR
Fritz G. Cornell, Jr.
BY Kenyon & Kenyon
ATTORNEYS.

Patented June 24, 1941

2,247,152

UNITED STATES PATENT OFFICE 2,247,152

HEAT EXCHANGE DEVICE

Fritz G. Cornell, Jr., Mountain Lakes, N. J.

Application August 31, 1938, Serial No. 227,641

8 Claims. (Cl. 159—13)

This invention relates to heat exchange devices and more especially to devices for removing vaporizable constituents of fluid materials.

An object of this invention is a vaporizer having a plurality of heat exchange units in a vacuum chamber, characterized by flow control means so arranged that one heat exchange unit constitutes a preheater of the liquid supplied to the remaining heat exchange unit.

A further object of this invention is the provision in a container of a plurality of heat exchange units having a large total heat exchange surface within a small area and being capable of removing vaporizable constituents from fluid material at a high rate and a relatively low temperature.

Heretofore, in milk concentrating and like apparatus comprising a container having within it a heat exchanger, the total contact surface permissible has been limited by the requirement that the entire contact surface be accessible for cleaning purposes. In one embodiment of the invention, the permissible contact surface is greatly increased by providing a plurality of vertical heat exchange units supported in side-by-side relation for swinging movement into positions in which they are spaced apart sufficiently to permit access for cleaning. Preferably the supporting means for the heat exchange units comprise swivels held in place with stuffing boxes for circulating attemperating liquid.

In the operation of a concentrator embodying the invention, heating medium may be passed through the heat exchange units at a temperature of 190° and a vacuum equal to 27 inches of mercury may be maintained in the container. As under such condition of vacuum the boiling temperature of milk is much less than 190°, flow of milk over the heat exchanger units is accompanied by violent ebullition causing the milk to be forced away from the surface of the exchangers. To effect return of such milk immediately into contact with the exchanger, thereby insuring contact of milk over the entire surface of the exchanger, louvers or the like are arranged at either side of each heat exchange unit. The arrangement of the louvers is such that the flowing particles of milk are intercepted and returned to the heat exchanger while there is free access for vapor and steam between the louvers. The louvers preferably are so arranged that they may be moved away from the heat exchange units to give access thereto for cleaning.

Any suitable heating medium may be used such, for example, as steam, hot water, etc. Using heat exchangers of the corrugated countercurrent type it is practical to use water at a temperature considerably below that which would be required if steam were used. Because of the countercurrent method of circulation within the heat exchanger, only very small reduction of temperature occurs as the water passed therethrough. To prevent a marked lowering of the water temperature, the exchanger may be so constructed as to carry a large volume of hot water, in which case, each corrugation of the exchanger is at a temperature approximately that of the entering water. Therefore, for practical purposes, it may be considered that the temperature of the water is uniform throughout the exchanger. This results in the milk, each time it is returned to the heating surface by the louvers, contacting a practically uniform degree of heat, whereupon it immediately is re-heated above the temperature at which evaporation occurs, thus resulting in an extraordinary rapid driving off of moisture.

The apparatus above described permits concentration of milk at a low temperature, thereby avoiding any effect on the milk of high temperature. Also, the milk is uniformly treated and the vaporizable material is removed in a shorter time than has heretofore been possible.

Other objects, novel features and advantages of this invention will be apparent from the following specification and accompanying drawings, wherein Figure 1 is a vertical section through a concentrator embodying the invention;

Fig. 2 is a section on the line 2—2 of Fig. 1;

Fig. 3 is a section on the line 3—3 of Fig. 1;

Fig. 4 is a fragmentary perspective view of a heat exchanger equipped with louvers.

Figure 5:
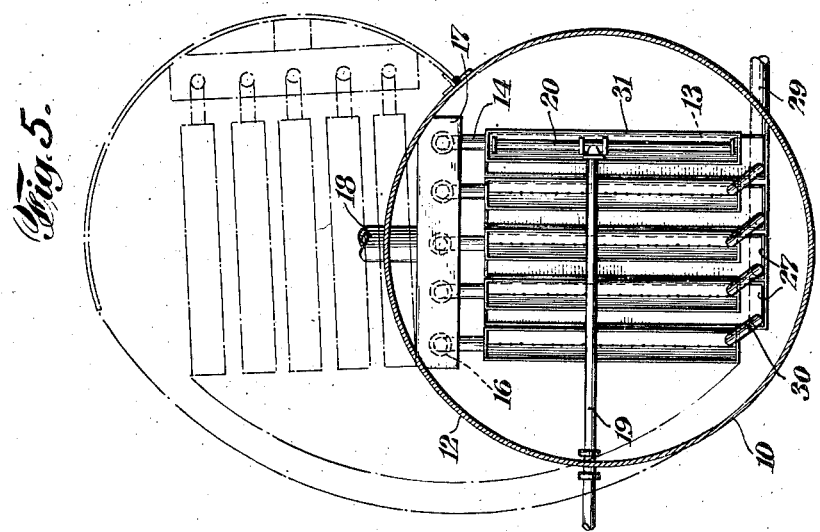
Fig. 5 is a view similar to Fig. 2 illustrating a modification.

Referring now more specifically to Figs. 1 to 4 inclusive, 10 is a substantially cylindrical container having a conduit 11 leading from the top thereof to a vacuum producing means (not shown) by which any desired degree of vacuum is maintained within the container 10. Access is had to the interior of the container through a doorway for which is provided a door 12 of suitable construction to seal the doorway when closed. Within the container 10 are arranged heat exchangers 13, the number of which may be varied according to the results desired but five being shown herein for illustrative purposes. The heat exchangers may be of any well known type having horizontal channels through which attemperating fluid flows in series, and for illustration purposes are here shown as being composed of two contacting metal plates having horizontal offset portions cooperating to form the channels for the attemperating fluid. Each heat exchanger is provided with pipes 14 and 15 by means of which the attemperating fluid is circulated through the heat exchanger. By means of suitable swivel connections 16 the pipes 14 and 15 are connected to supply and discharge headers 17. Each of the heat exchangers is thus mounted for swinging movement by connections through which the attemperating fluid is supplied to and discharged from such exchanger. Normally the heat exchangers are in parallel spaced relation shown in Fig. 2 in full lines, but the arrangement of the headers is such that the heat exchangers may be swung to position shown in dotted lines in Fig. 2 whereby they are accessible through the doorway for cleaning. Attemperating liquid is supplied to and removed from the headers 17 by pipes 18 which extend through the wall of the container 10.

Milk or other liquid to be concentrated is introduced into the container through the pipe 19 and is delivered to a distributor pipe 20 overlying the top edge of one heat exchanger 13, the pipe 20 being provided with a series of apertures by means of which the liquid to be treated is distributed uniformly over the entire length of the heat exchanger. Liquid is withdrawn from the bottom of the container through the pipe 21 and by means of the pump 22 a portion or all of the withdrawn liquid is again introduced into the container through the pipe 23 to which distributor pipes 24 are connected, one for each of the remaining heat exchangers 13, the distributor pipes 24 being similar to the distributor pipe 20. The liquid thus returned to the container is caused to pass downwardly over the heat exchangers and is collected in the bottom of the container 10. Under normal operating conditions, only a portion of the liquid withdrawn from the bottom of the container is recirculated and the remainder is delivered by the pipe 25 to any suitable collecting tank.

Each heat exchanger is equipped with two sets of horizontal louvers 26 which are arranged to slant inwardly and downwardly so that the lower edge of each preferably is approximately in alignment with one horizontal channel of the heat exchanger and the upper edge preferably is approximately in alignment with the next higher horizontal channel. These louvers are supported by rods or the like 26a which are bent inwardly to overlie the top edge of the heat exchanger so that the louvers are supported by the heat exchangers in such manner that they are easily and quickly removable therefrom when it is desirable to clear the heat exchanger.

In the operation of the concentrator, the desired degree of vacuum is maintained in the container 10 thereby reducing to a very considerable degree the boiling temperature of the liquid to be treated. Attemperating liquid of the proper temperature to effect boiling of the liquid to be treated, but without subjecting it to injurious temperatures, is circulated through the heat exchangers. In order to develop maximum efficiency it is desirable first to remove air from the liquid to be treated and this is effected by passing the fresh liquid through the pipe 19 to a single one of the heat exchangers. During the passage of such fresh liquid over the heat exchanger some evaporation takes place, but the principal effect is the removal of the air. The remaining heat exchangers are effective to bring about the necessary evaporation to accomplish the desired concentration of the liquid.

Both the liquid supplied through the pipe 19 and the recirculated liquid supplied through the pipe 23 are preferably introduced into the container at nearly their evaporation temperature. When such liquid comes into contact with the surface of the heat exchanger violent ebullition is effected in the liquid resulting in blowing away particles of the liquid from the heat exchangers. Such particles are intercepted by the louvers 26 and are returned to the heat exchangers so that substantially the entire surface of each heat exchanger is utilized for heating the liquid under treatment. Also the return of the liquid under treatment to the heat exchanger results in maintaining the heat exchanger at relatively uniform temperature throughout its entire area. Although the louvers intercept the flying particles of liquid and return the same to the heat exchangers, they provide paths for the escape of steam and vapor so that there is no interference with the free flow of liquid over the surface of the heat exchangers.

As illustrated in Fig. 5, the headers 17 may be supported by the door 12 so that by swinging the door into the dotted line position the heat exchangers will be swung completely exterior of the casing, thus rendering the same more easily accessible for cleaning. After having been removed from the container by opening of the door, the heat exchangers may then be swung on their hinge supports to space them apart for cleaning purposes.

It is, of course, understood that various modifications may be made in the apparatus above described without in any way departing from the spirit of the invention as defined in the appended claims. Preferably, the heat exchangers are of the construction illustrated in Cornell Patent No. 2,120,797 but it is, of course, to be understood that other suitable forms of heat exchangers may be used.

I claim:

1. A device of the character described comprising a container, means for maintaining vacuum in said container, a plurality of vertical heat exchangers arranged in said container in side by side relation, means supporting said exchangers for movement from side by side relation to positions in which they are spaced apart to permit access for cleaning, means for circulating heating fluid through said exchangers, means for supplying liquid to one heat exchanger, means for withdrawing liquid from said container and supplying the same to the remaining exchangers and means for returning to each exchanger liquid forced off therefrom by ebullition.

2. A device of the character described comprising a container, means for maintaining vacuum in said container, a plurality of vertical heat exchangers arranged in said container in side by side relation, means supporting said exchangers for movement from side by side relation to positions in which they are spaced apart to permit access for cleaning, means for circulating heating fluid through said exchangers, means for supplying liquid to one heat exchanger, means for withdrawing liquid from said container and supplying the same to the remaining exchangers, and superposed horizontal louvers on each side of each heat exchanger, said louvers being closer to the exchanger at their lower edges than at their upper edges.

3. A device of the character described comprising a container, means for maintaining vacuum in said container, a plurality of vertical heat exchangers arranged in said container in side by side relation, means supporting said exchangers for movement from side by side relation to positions in which they are spaced apart to permit access for cleaning, means for circulating heating fluid through said exchangers, means for supplying liquid to one heat exchanger, and means for withdrawing liquid from said container and supplying the same to the remaining exchangers.

4. A device according to claim 3 wherein said container is provided with a hinged door and said heat exchangers are supported by said door.

5. A device of the character described comprising a container, means for maintaining vacuum in said container, a plurality of vertical heat exchangers supported in said container, means for circulating heating fluid through said exchangers, means for supplying liquid to one heat exchanger, means for withdrawing liquid from said container and supplying the same to the remaining exchangers and means for returning to each exchanger liquid forced off therefrom by ebullition.

6. A device of the character described comprising a container, means for maintaining vacuum in said container, a plurality of vertical heat exchangers supported in said container, means for circulating heating fluid through said exchangers, means for supplying liquid to one heat exchanger, means for withdrawing liquid from said container and supplying the same to the remaining exchangers, and superposed horizontal louvers on each side of each heat exchanger, said louvers being closer to the exchangers at their lower edges than at their upper edges.

7. A device of the character described comprising a container, means for maintaining vacuum in said container, a plurality of vertical heat exchangers supported in said container, means for circulating heating fluid through said exchangers, means for supplying liquid to one heat exchanger, and means for withdrawing liquid from said container and supplying the same to the remaining exchangers.

8. A device according to claim 7 wherein said container is provided with a hinged door and said heat exchangers are supported by said door.

FRITZ G. CORNELL, JR.